(12) United States Patent
Agami et al.

(10) Patent No.: US 7,243,856 B2
(45) Date of Patent: Jul. 17, 2007

(54) LOADING INTERNAL APPLICATIONS ON A SMARTCARD

(75) Inventors: Mishael Agami, Netanya (IL); Dani Dariel, Yishuvei Gederot (IL)

(73) Assignee: SanDisk IL Ltd.., Kfar Saba (IL)

( * ) Notice: Subject to any disclaimer, the term of this patent is extended or adjusted under 35 U.S.C. 154(b) by 61 days.

(21) Appl. No.: 11/171,187

(22) Filed: Jul. 1, 2005

(65) Prior Publication Data
US 2006/0214005 A1    Sep. 28, 2006

Related U.S. Application Data

(60) Provisional application No. 60/664,667, filed on Mar. 24, 2005.

(51) Int. Cl.
*G06K 19/06*    (2006.01)
(52) U.S. Cl. .................. 235/492; 235/380; 365/185.33; 711/100
(58) Field of Classification Search ................. 235/436, 235/451
See application file for complete search history.

(56) References Cited

U.S. PATENT DOCUMENTS 6,513,719 B1 *  2/2003  Imura ......................... 235/492
6,581,843 B2 *  6/2003  Nobukata ................... 235/492
7,099,190 B2 *  8/2006  Noguchi et al. ........ 365/185.09
2005/0210287 A1 *  9/2005  Paatero ....................... 713/201

OTHER PUBLICATIONS

Yim et al. ("A Flash compression Layer for SamrtMedia Card System", IEEE Transactions on Comsumer Electronics, vol. 50, No. 1, pp. 192-197, Feb. 2004).*

* cited by examiner

*Primary Examiner*—Seung Ho Lee
(74) *Attorney, Agent, or Firm*—Mark M. Friedman

(57) ABSTRACT

Portable smartcard devices, methods of executing program code using smartcard devices, and computer readable storage media including instructions for smartcard devices are provided. According to some embodiments, the presently disclosed smartcard device includes an interface for presenting smartcard functionality to a host system and for receiving a program execution command from the host system, non-volatile memory, executable memory, a copying mechanism such as an internal copying mechanism for copying program code from the non-volatile memory to the executable memory, and a program execution mechanism for executing the program code. Appropriate interfaces include but are not limited to ISO 7816 compatible interfaces, USB interfaces, and MMC interfaces. In some embodiments, the smartcard functionality includes SIM functionality and/or USIM functionality. Optionally, execution of the program code commences when only a portion of the copied executable code resides in the executable memory. A method of delivering pre-loaded protected executable code to smartcard users is disclosed.

40 Claims, 10 Drawing Sheets

LOADING INTERNAL APPLICATIONS ON A SMARTCARD

CROSS-REFERENCE TO RELATED APPLICATIONS

This patent application claims the benefit of U.S. Provisional Patent Application No. 60/664,667, filed Mar. 24, 2005 by the present inventors.

FIELD OF THE INVENTION

The present invention relates to smartcard devices, and in particular to smartcard devices operative to execute application code stored in non-volatile memory.

BACKGROUND OF THE INVENTION

Smartcard Devices

The term "smartcard" herein denotes any device which may be conveniently carried upon one's person and which contains an active internal logic device capable of securely interfacing with and exchanging data with specifically authorized external devices. Smartcards are sometimes referred to as "integrated circuit cards" or "chip cards". Generally, smartcards contain memory, a microcontroller with its associated logic memory, and executable code.

One salient feature of many smartcard devices is that their stored data can be protected against unauthorized access and manipulation by restricting access to an interface that is controlled by an operating system and security logic. Confidential data can thus be written to a smartcard and stored in a manner that prevents the data from ever being read by a device external to the smartcard.

The International Standard Organization (ISO) publishes mechanical and electrical specifications for smartcards such as the ISO 7816 group of standards. Smartcards based on the standards for integrated circuit cards generally conform thereto, where applicable, but also include features not necessarily described therein. Smartcards are generally differentiated by the amount of included memory, the Integrated Circuit (IC), capability of handling complex processing, cryptographic scheme, electrical interface, and mechanical layout.

Purposes to which smartcards may be applied include, but are not limited to, public telephony cards, bank cards used in Point-of-Sale (POS) terminals and Automatic Teller Machines (ATMs), Pay TV in set-top boxes, and wireless telecom operators implementing Subscriber Identity Module (SIM) cards in Global System for Mobile (GSM) terminals. SIM cards are of particular interest because of (a) their small form factor, (b) they are put in place only once with the power off, and (c) their commercial importance. With the introduction of the Universal Mobile Telecommunication System (UMTS) as the third-generation (3G) European mobile phone technology, a new version of the SIM card called USIM (UMTS Subscriber Identity Module or Universal Subscriber Identity Module) has been introduced for the UMTS mobile network. USIM cards contain relevant information for enabling access to a UMTS-subscribed operator network. Both the SIM card and the USIM card fall within the smartcard category.

The use of smartcards with mobile telephones has been especially significant in promoting the international proliferation of smartcards. GSM phones utilize smartcards as an access medium in part because smartcards allow a high degree of security to be achieved when accessing the mobile telephone network, and also because they provide new possibilities and thus major advantages in marketing mobile telephones, since they enable network operators and service providers to sell telephones and services separately.

FIG. 1 illustrates an example of a prior art smartcard architecture. The card (4) includes a set of pins (1) defined by the ISO standard for connecting to a host system including clock, data signal for data transfer, reset signal, and power pins. A CPU (3) is connected to the pins(1) via a bus interface (2). The CPU (3) has access to an area of ROM (7) that stores executable code, to RAM (5), and an EEPROM component (6) used mainly for storing configurable data (e.g. private encryption keys). For supporting large amounts of data and/or demanding applications, enhanced memory capacity in the form of flash memory may also be provided.

FIG. 2A illustrates the mechanical layout of a prior art ISO-compatible smartcard (41) and the set of eight terminals (40) used to interface with the card. The ISO standard defines only five pins, while the three additional pins are reserved for future use.

FIG. 2B illustrates the physical form factor of a prior art SIM or USIM card.

Besides the ISO interface, other smartcards interfaces have been defined. These additional interfaces usually provide high-speed data transfer, and are mainly for use with high-capacity memory cards. Typical smartcard interfaces include but are not limited to Secure Digital (SD), Multi Media Card (MMC), and wireless/contactless interface. Lately, Universal Serial Bus (USB) has been suggested as another potential interface for smartcards. New interfaces either use the reserved ISO pins or define a new set of pins in addition to or instead of the ISO-standard pins.

FIG. 3 illustrates an exemplary architecture of a prior art advanced smartcard. In this example, two internal buses (14) and (15) allow independent access to the CPU (13) via a standard ISO interface (10), and to a flash memory module (18) using a secondary USB interface (11). The ROM (9) is used for storing the operating system and application code.

The separate bus interfaces (16) and (17) allow independent access to the card resources. Two separate applications can access the card independently under this architecture. For example, a mobile phone with integrated MP3 player can access the internal flash memory via the USB bus (11) to access music data, while a cellular roaming application can access roaming-related information from a SIM function using the ISO bus (10).

Modern smartcard operating systems allow new applications to be uploaded to the card after the card has been issued to the user. The term "issuer" herein denotes any entity which distributes smartcards for a particular purpose or set of purposes. The term "user" herein denotes any person using, or attempting to use, a specific smartcard. The term "authorized user" herein denotes a person who has been given permission, or is "authorized", to use that smartcard for a specific purpose or set of purposes. In many cases, the authorized user of a smartcard is the owner thereof, but the owner and authorized user need not be the same.

The new flexibility afforded by these modern smartcard operating systems opens up completely new application areas. For example, personal security modules, which are indispensable in Internet commerce and payments, are made trustworthy through the use of smartcards. These security modules can securely store personal keys and execute high-performance cryptographic algorithms. Security-related tasks can be performed in an elegant manner by a microprocessor with a cryptographic coprocessor.

The amount of memory provided within smartcards is increasing as new technologies are introduced enabling the production of high-capacity memory on a small die. Memory technology enhancements enable smartcards to support more applications by incorporating high-capacity flash memory on the card itself.

As mobile handsets with increased multimedia capabilities become available, and as service providers begin implementing broadband mobile services, the need for secure, scalable, and configurable high-capacity storage is becoming acute. One example of an enhanced large-capacity (U)SIM card is M-Systems' (Newark, Calif.) MegaSIM™ card module. With MegaSIM, (U)SIM card vendors can provide their mobile operator customers with a (U)SIM card enabling a variety of advanced mobile services, such as downloading MMS, MP3, and video clips, full Personal Information Management (PIM) functionality, and high-resolution picture storage.

With the emergence of new applications demanding large amounts of memory, high-end mobile phones have started providing a dedicated interface for memory cards to hold the data required by these applications. Typical applications include integrated cameras that require a large amount of memory to store still pictures and/or video clips, MP3 files, and Multi-Media Messaging Service (MMS) messages. Up until now, memory cards offered megabytes (MB) of memory and (U)SIM cards only kilobytes (KB). With the introduction of MegaSIM containing megabytes of memory, enhanced applications can utilize a (U)SIM card for both legacy use and to store large amounts of data for multimedia devices and applications.

In summary, the emergence of advanced operating systems running on smartcards, and multimedia applications such as digital stills or video pictures(MPEG files), music (MP3 files), games, and the need for higher memory capacity on smartcards opens up a variety of new opportunities to mobile network operators and service providers.

Execution of Executable Code Using Smartcard Devices

In many high-capacity memory cards, most of the memory provided is non-eXecute In Place (XIP) flash memory, which is based on NAND flash technology. This type of memory is much cheaper and denser than the typical non-volatile XIP memory based on EEPROM or NOR flash technology, and provides higher write/erase performance.

Currently, executable code is stored in ROM, or on embedded flash memory based on NOR flash technology, both of which are capable of directly executing code. Thus, the use of non-XIP flash memory prevents the on-board processor from executing code directly from internal mass memory storage based on NAND flash technology. In order to run an application that resides in this memory storage area, the application code must be copied from the non-XIP flash memory area to the XIP memory area. Moving the code requires an external copying through an external device or host device, where the external device reads the code and writes the code back to the executable memory area within the smartcard. This copying mechanism transfers the data via the smartcard interface(s), which, unfortunately, implies relatively slow performance. In addition, the above-described mechanism exposes the executable code on an external smartcard interface, subjecting the code to monitoring and/or copying while it is being transferred from non-XIP memory to XIP memory.

There is an ongoing need for high performance and secure smartcard devices for executing executable code stored non-volatile memory of the smartcard device.

SUMMARY OF THE INVENTION

The aforementioned needs are satisfied by several aspects of the present invention.

It is now disclosed for the first time a portable smartcard device for executing program code upon receipt of a command from a host system. The presently disclosed smartcard device includes at least one interface for presenting smartcard functionality to the host system and for receiving the command from the host system, a non-volatile memory (e.g. non-XIP memory) for storing the program code before program execution, an executable memory for storing at least a portion of the program code during program execution, and an internal copying mechanism for copying the at least a portion of the program code to the executable memory.

It is noted that presently disclosed smartcard devices provided by certain embodiments of the present invention have an internal copying mechanism, thereby obviating the need to copy executable code through an external device. By reducing or eliminating the circuitous copying of code through an external device, the transferring of code from non-XIP memory to XIP memory is both faster and more secure, as there is no need to expose data on any of the smartcard interfaces.

According to some embodiments, the smartcard device includes an internal databus, and the internal copying mechanism effects the internal copying through the internal databus. In some embodiments, the internal copying mechanism effects the internal copying only through the internal databus.

According to some embodiments the smartcard functionality includes SIM functionality and/or USIM functionality.

One exemplary application of the presently disclosed smartcard devices relates to mobile handsets. Using smartcard devices provided by certain embodiments of the present invention, a mobile service provider can pre-load applications to the non-XIP memory area on a (U)SIM card, which is large enough to hold numerous applications. These applications are kept protected within the smartcard memory from being copied or manipulated by the mobile service provider's customers.

According to some embodiments, the presently disclosed internal copying of executable code is based on adding one or more additional commands to the smartcard command portfolio. One or more of these new commands instructs the smartcard processor to perform a copy operation from non-volatile memory, such as non-executable memory, to the smartcard internal XIP memory.

According to some embodiments, the non-volatile memory includes non-executable memory.

There is no specific limitation on the type of interface or number of interfaces provided in the presently disclosed smartcard device. Appropriate interfaces include but are not limited to ISO 7816 compatible USB interfaces, any interface other than 7816 compatible interfaces, USB interfaces, and MMC interface.

In some embodiments, the smartcard device includes a plurality of interfaces where a first interface is an ISO 7816 compatible interface and the second interface is other than an ISO 7816 compatible interface. In particular embodiments, the command is received through the second interface. Alternatively, the command is received through the first interface.

Upon copying of at least some of the portion of the program code to executable memory, actual execution of the program code may commence. In some embodiments, the device further includes a program execution mechanism such as an internal processor for executing the copied portion of the program code.

Not wishing to be bound by any particular theory, it is noted that commencing program execution when only some of the portion of the program code resides in executable memory is particularly useful for situations where the size of the program exceeds the amount of available executable memory. Subsequent to the commencing of program execution, required portions of program code that do not reside in executable memory can be loaded or copied into executable memory as needed, such as after a page fault.

It is now disclosed for the first time a portable smartcard device for executing program code upon receipt of a command from a host system. The presently disclosed smartcard device includes at least one interface for presenting smartcard functionality to the host system and for receiving the command from the host system, a non-volatile memory (e.g. non-XIP memory) for storing the program code before program execution, an executable memory for storing at least a portion of the program code during program execution, a copying mechanism for effecting a copying of the at least a portion of the program code to the executable memory, and a program execution mechanism for commencing execution of the copied portion of the program code when only a first subportion of the copied portion resides in the executable memory.

According to some embodiments, the smartcard device includes an internal databus, and the internal copying mechanism effects the internal copying through the internal databus. In some embodiments, the internal copying mechanism effects the internal copying only through the internal databus.

Alternatively, the copying effected by the copying mechanism includes an external copying through the host system.

According to some embodiments, the smartcard device further includes a paging mechanism for paging at least a second subportion of the copied portion of the program code from the non-volatile memory (e.g. non-XIP memory) to the executable memory during execution. In some embodiments, paged code is loaded or copied from non-volatile memory (such as non-XIP memory) into executable memory as need, for example, after a page fault. Thus, not all "paged" code is necessarily actually copied or loaded into executable memory during a given execution of program code.

It is now disclosed for the first time a method of executing program code with a smartcard device. The presently disclosed method includes including within the smartcard device an internal copying mechanism, copying at least a portion of the program code from non-volatile memory (e.g. non-XIP memory) of the smartcard device to executable memory of the smartcard device using the internal copying mechanism, and upon receipt of an execution command through an interface of the smartcard device, executing the copied portion of the program code.

According to some embodiments, the copying includes copying from non-executable memory of the smartcard device to the executable memory of the smartcard device.

According to some embodiments, the copying is effected using only an internal data bus of the smartcard device.

There is no specific limitation on the interface through which the execution command can be received. Appropriate interfaces include but are not limited to ISO 7816 compatible interfaces, any interface other than 7816 compatible interfaces, USB interfaces, and MMC interface.

It is now disclosed for the first time a method of executing program code with a smartcard device. The presently disclosed method includes including within the smartcard device a copying mechanism, copying at least a portion of the program code from non-volatile memory (e.g. non-XIP memory) of the smartcard device to executable memory of the smartcard device using the copying mechanism, and upon receipt of an execution command through an interface of the smartcard device, commencing execution of the copied portion of the program code when only a first subportion of the some of the portion resides in the executable memory.

According to some embodiments, the execution command is received from a host device.

According to some embodiments, the copying includes only internal copying through an internal data bus of the smartcard device.

Alternatively, the copying includes external copying through the host device.

According to some embodiments, the executing includes paging of at least a second subportion of the portion of the program code from the non-volatile memory to the executable memory during the executing.

It is now disclosed for the first time a method of delivering pre-loaded protected executable code. The presently disclosed method includes the steps of providing to at least one smartcard user a respective smartcard device having the pre-loaded protected executable code stored in non-volatile memory and a copying mechanism for copying the pre-loaded protected executable code, after the providing, receiving from each smartcard user valid user authentication credentials and an execution command through an interface of the respective smartcard device, using the copying mechanism of the respective smartcard device, copying at least a portion of the pre-loaded protected executable code from the non-volatile memory of the respective smartcard device to executable memory of the respective smartcard device, and using the respective smartcard device, executing the portion of the program code.

According to some embodiments, for at least one respective smartcard device the copying includes only copying through an internal data bus.

According to some embodiments, for at least one respective smartcard device at least one of the user authentication credentials and the execution command is received via a host device, and the copying includes external copying through the host device.

It is now disclosed for the first time computer readable storage medium having computer readable code embodied in the computer readable storage medium, the computer readable code for receiving a command to execute program code stored in a non-volatile memory of a smartcard device, internally copying at least a portion of the executable program code from the non-volatile memory of the smartcard device to executable memory of the smartcard device; and executing by the smartcard device the portion of the program code.

It is now disclosed for the first time computer readable storage medium having computer readable code embodied in the computer readable storage medium, the computer readable code for receiving a command to execute program code stored in a non-volatile memory of a smartcard device, copying at least a portion of the executable program code from the non-volatile memory of the smartcard device to executable memory of the smartcard device and commencing executing by the smartcard device of the portion of the program code when only a subportion of the portion resides in the executable memory.

These and further embodiments will be apparent from the detailed description and examples that follow.

DETAILED DESCRIPTION OF THE INVENTION

Embodiments of the present invention provide smartcard devices including a copying mechanism for copying program code from non-volatile memory to executable memory. Furthermore, presently disclosed methods of executing program code on a smartcard device include the copying of program code from non-volatile memory to executable memory. Typically, the "non-volatile memory" from which the program code is copied is non-executable or non-XIP memory, though this should not be construed as a specific limitation. Similarly, it is noted that in some embodiments of the present invention, what is referred to as "executable memory" is also non-volatile memory, though this is not a specific limitation.

The present invention will now be described in terms of specific, example embodiments. It is to be understood that the invention is not limited to the example embodiments disclosed. It should also be understood that not every feature of the smartcard devices and methods of executing application code using a smartcard devices described is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first.

Figure 1:
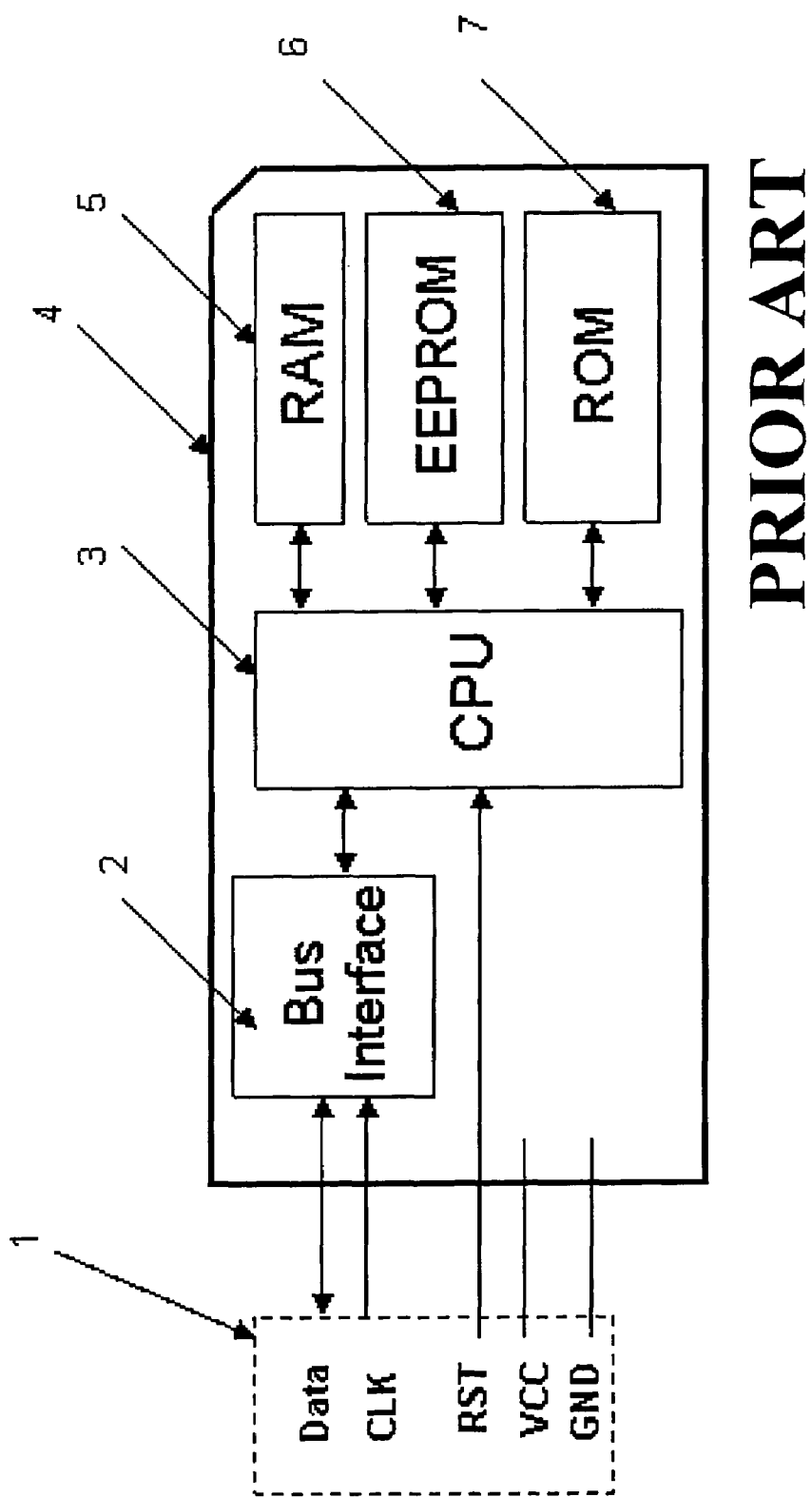
FIG. 1 illustrates an example of smartcard architecture.
Figure 2A:
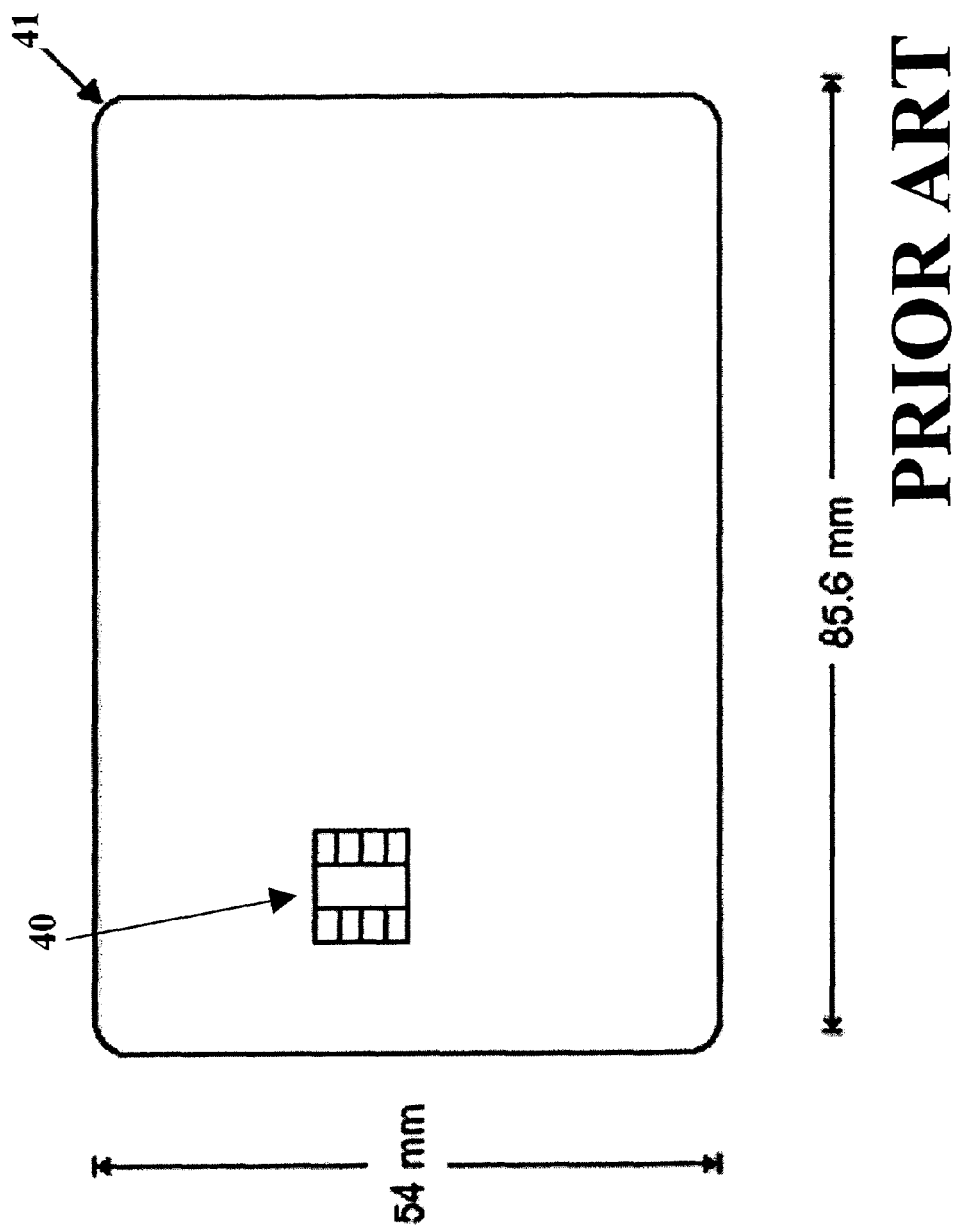
FIG. 2A illustrates the mechanical layout of an ISO-compatible smartcard.
Figure 2B:
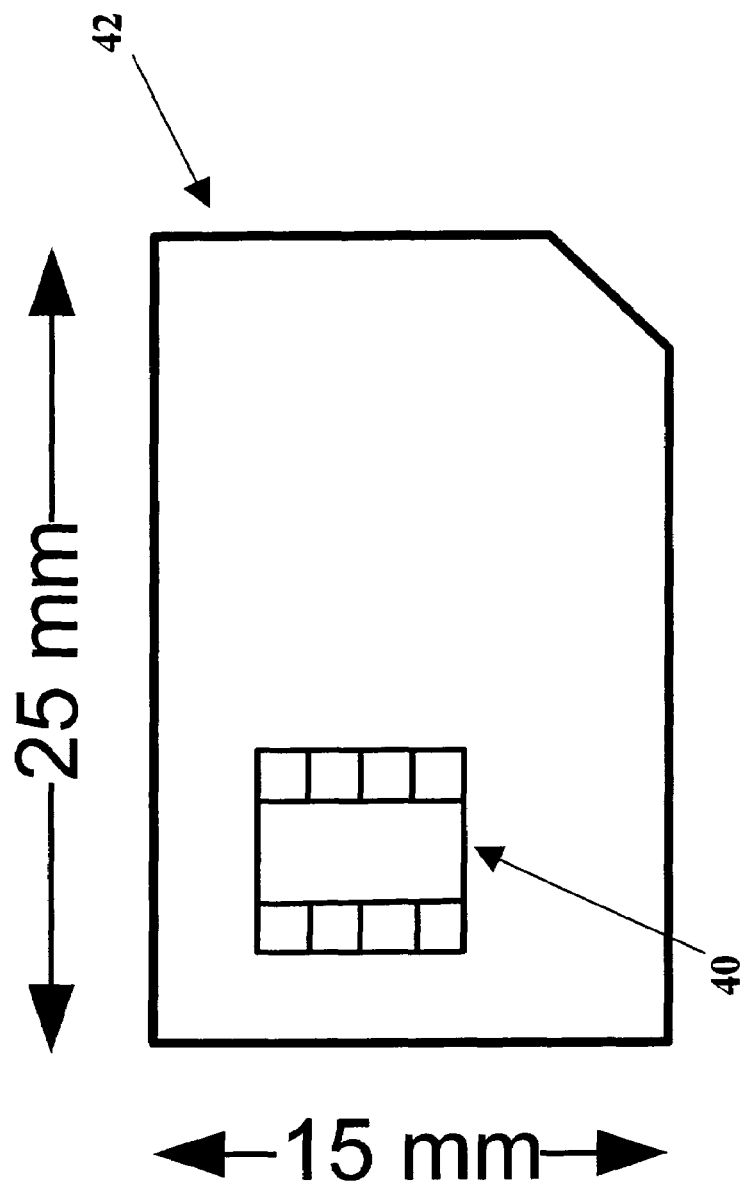
FIG. 2B illustrates the physical form factor of a SIM or USIM card.
Figure 3:
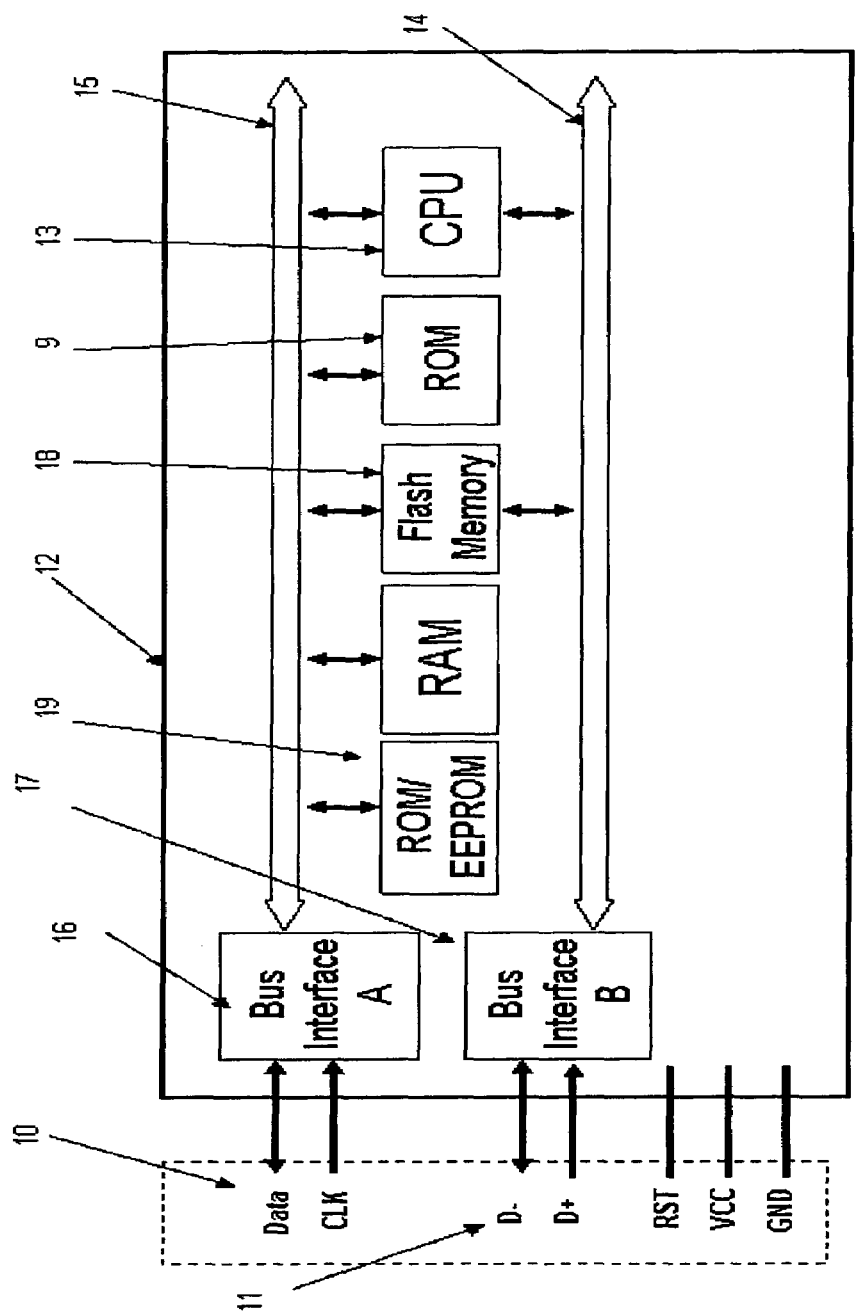
FIG. 3 illustrates an exemplary architecture of an advanced smartcard.
Figure 4:
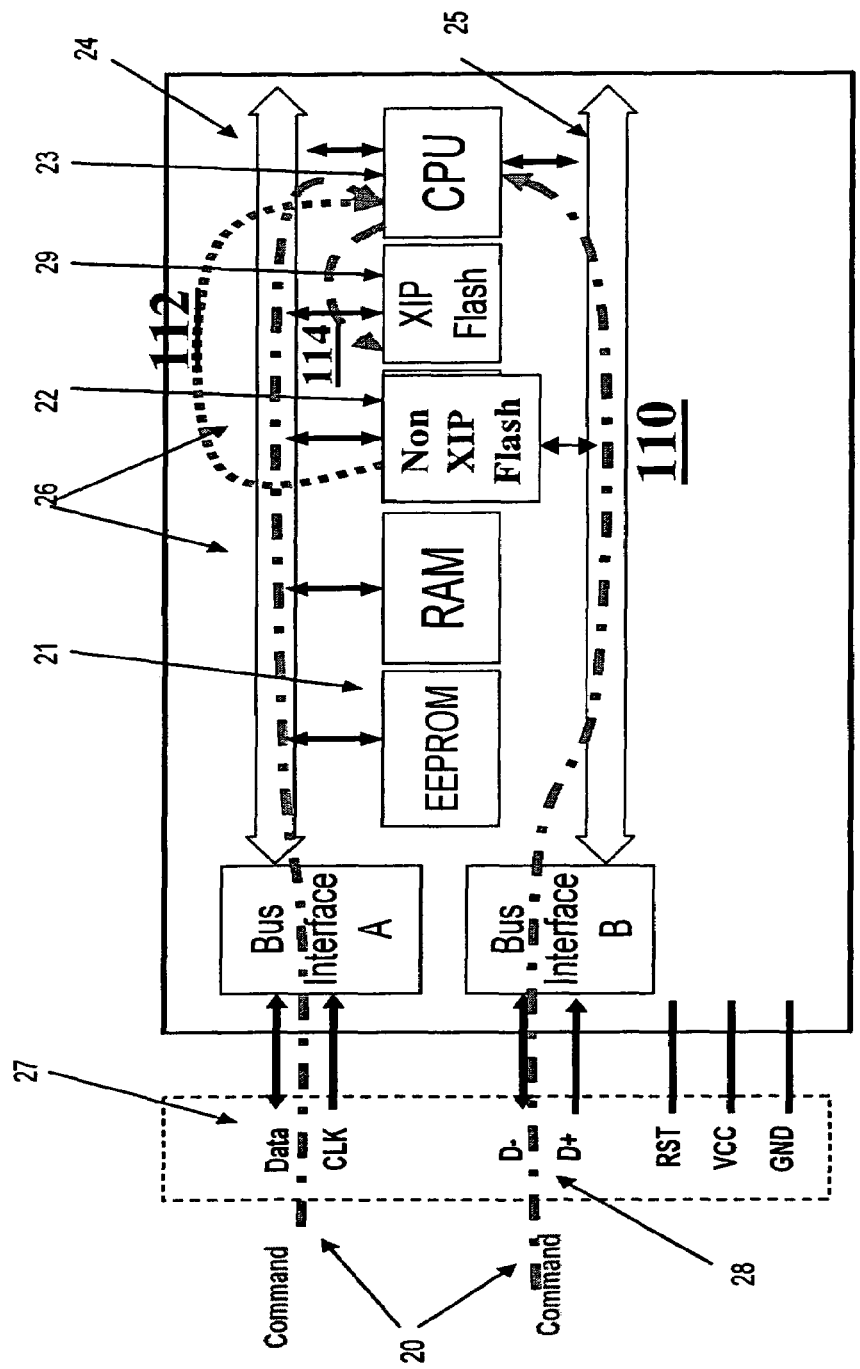
FIG. 4 illustrates a smartcard device according to some embodiments of the present invention.

FIG. 4 is an example of smartcard architecture with a standard ISO interface (27) and high-speed interface (28) in the form of USB. The high-speed interface is used mainly for high capacity data transfer to/from the smartcard internal mass memory storage, while the ISO interface is used for legacy mobile (U)SIM services. The device illustrated in FIG. 4 communicates with an external or host device via one or more interfaces using a specific protocol typical of smartcards, including but not limited to ISO 7816 protocols. In this example, the operating system and preloaded applications reside in XIP flash memory instead of ROM.

According to some embodiments, a command (20) to execute program code or a specific application is sent from an external or host device to the CPU (23) via one of the smartcard external interfaces, instructing the smartcard device to copy at least some of the desired application that resides within the non-XIP flash memory (22) to the smartcard's internal XIP memory, for example, the XIP flash (29). It is noted that the command may be sent via any of the smartcard interfaces.

The command refers to the application file residing within the mass memory storage area, and either instructs the CPU (23) to commence execution of the application or just to copy at least a portion of the application file. Optionally, the smartcard operating system also verifies that there is room in the XIP memory area to receive the application, and deletes an old application or other data in order to make room for the application file to be copied. In some embodiments, the smartcard CPU commences execution of an application that has been already loaded to the XIP memory upon receipt of a separate command.

After receiving (step 110) the execution and/or copy command, the CPU (23) reads at least a portion of the application file (step 112) from the smartcard's non-XIP memory (22) and copies (step 114) at least a portion of the application file to the executable or XIP memory, e.g. the XIP flash (29). In some embodiments, the file copy operation includes internal coping using the internal bus (26) to transfer the data. Alternatively or additionally, some embodiments provide for external copying through the host device (not shown).

After copying at least part of the application code to the XIP, the program execution mechanism of the smartcard device including the CPU (23) may commence execution of the application from the XIP flash (29). Alternatively, the program execution can be delayed, and the application may be executed after receiving a separate dedicated command, as explained previously.

As used herein, "execution" of an application or program code residing in executable memory includes execution of at least some instructions of the application or program code stored within the executable memory, and is not limited to execution of all instructions stored within the executable memory at any given time.

Figure 5A:
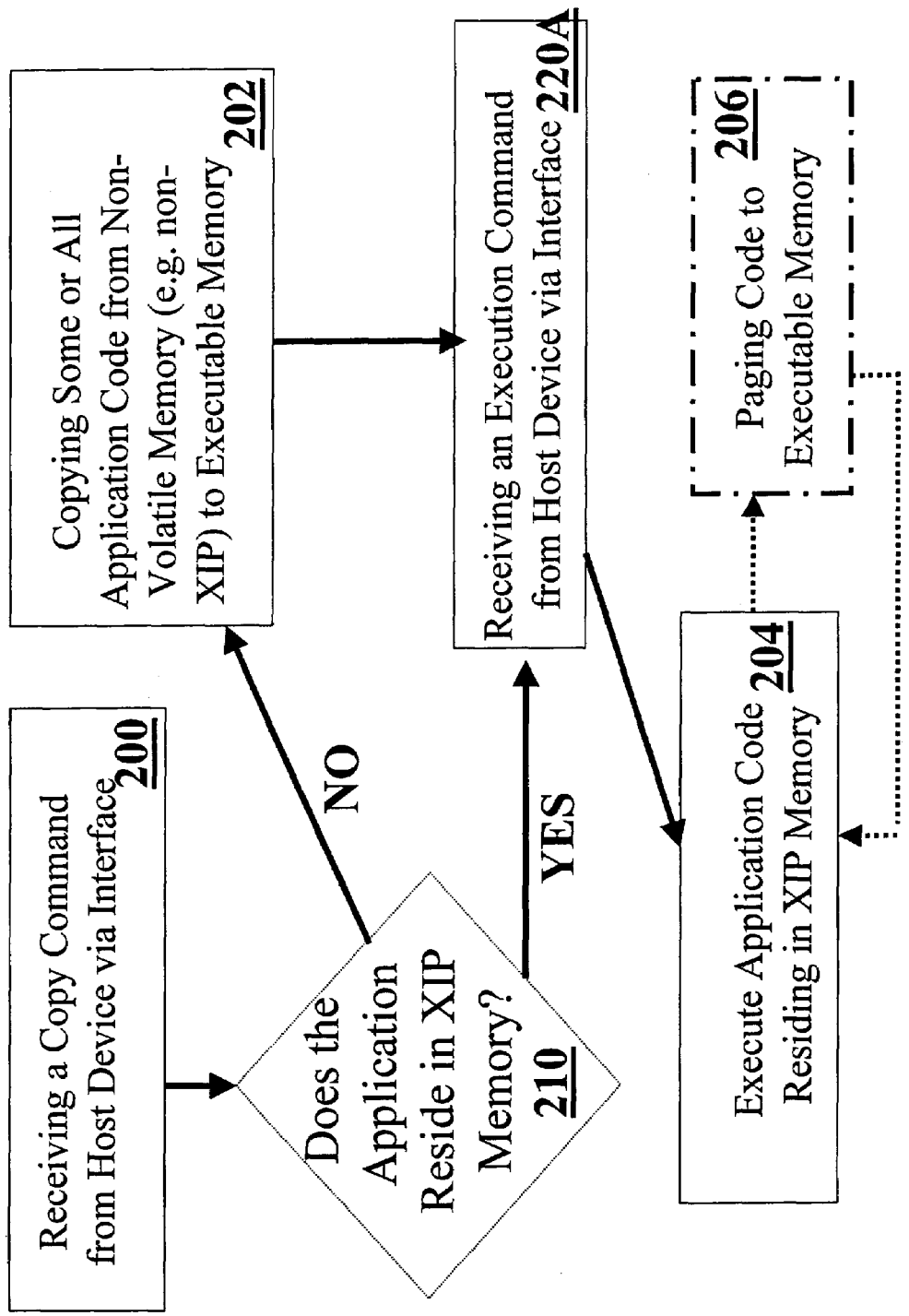
FIGS. 5A-C provide flowcharts describing methods of copying and executing code on a smartcard device according to exemplary embodiments of the present invention.
Figure 5B:
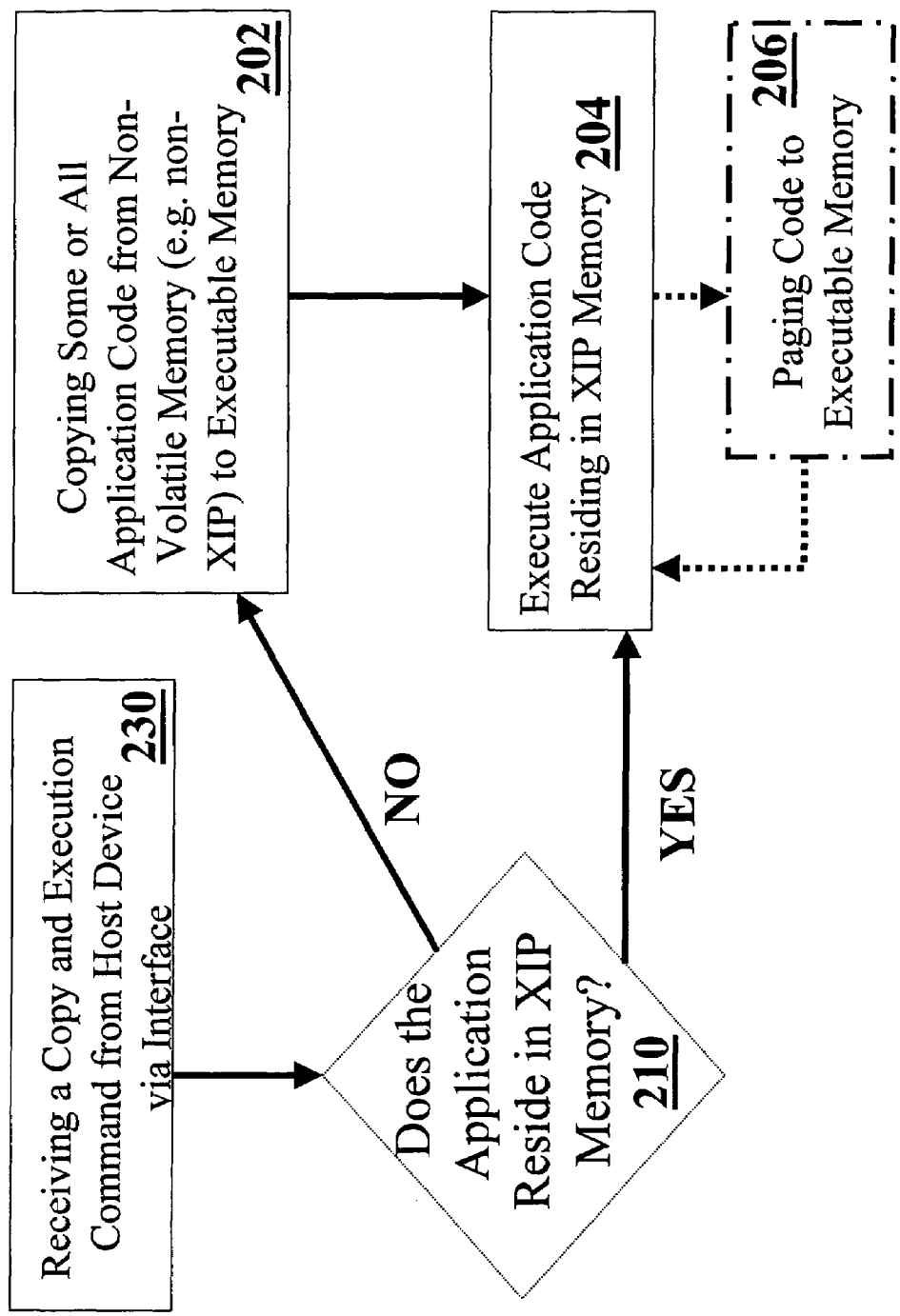
Figure 5C:
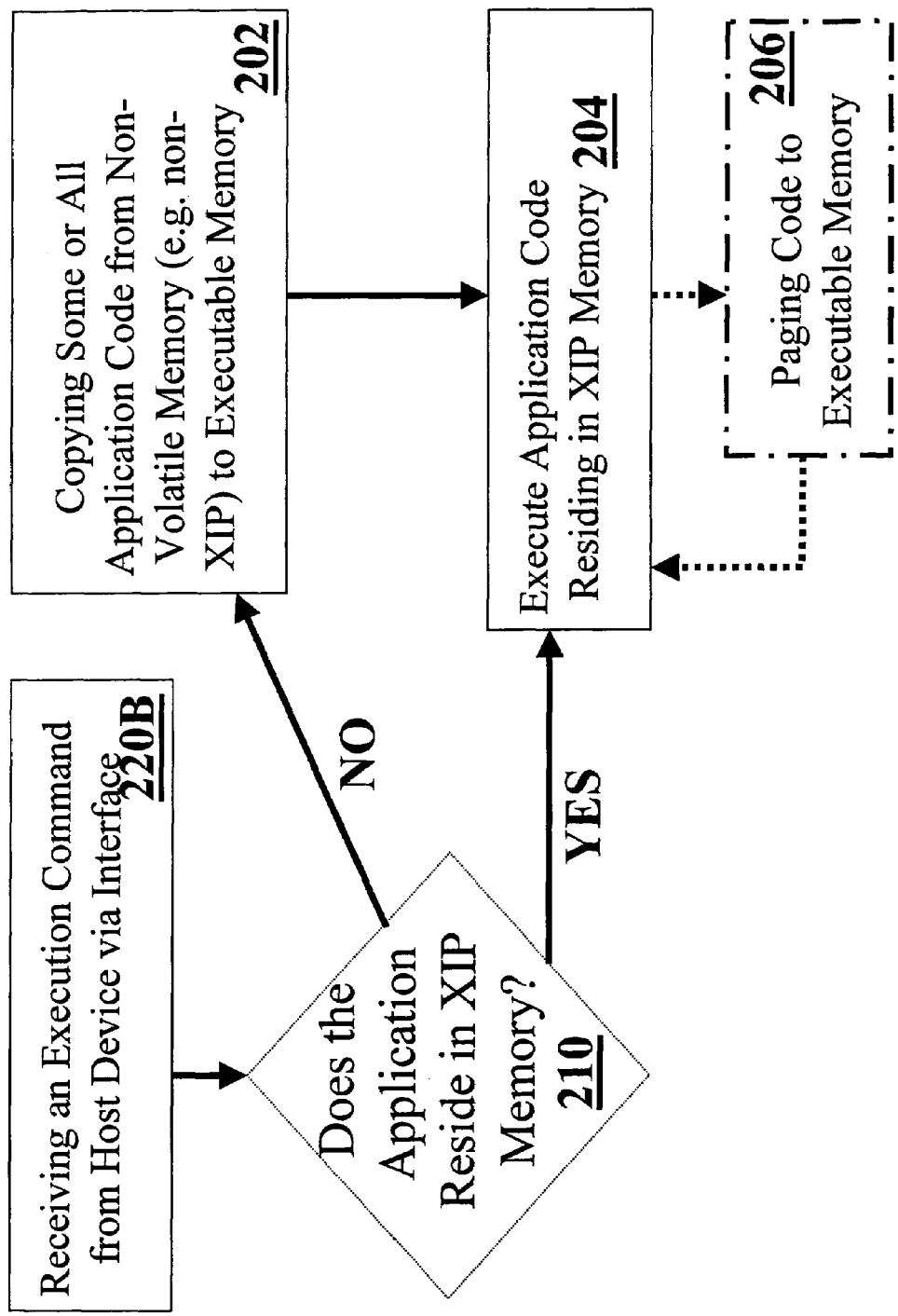

FIGS. 5A-5C provides a flowchart describing methods of copying and executing code on a smartcard device according to exemplary embodiments of the present invention. Referring now to FIG. 5A, an explicit copy command is received from the host device (200) via an interface of the smartcard. Optionally, the operating system checks if the application already resides (210) in XIP memory. In the event that the application does not reside in XIP memory, some or all of the application code is copied (202) from non-volatile memory (e.g. non-XIP memory) to the executable memory (XIP memory). Upon receiving an execution command from the host device (220A), the application code is executed (204). It is noted that there is no limitation on the time which the execution command (220A) may be received, and appropriate times include immediately after the copying (202), or, alternatively, after a time delay wherein the execution is delayed to a later time.

FIG. 5B provides a flow chart describing some embodiments of the present invention. As illustrated in FIG. 5B, both a copy and an execution command is received from the host device (230) via an interface, though it will be appreciated that these two commands may be implemented as a single command to copy and executed application code. After optionally checking if the application resides in XIP memory (210), the application is executed (204).

FIG. 5C provides a flow chart describing some embodiments of the present invention. As illustrated in FIG. 5C, an execution command is received from the host device (220B). According to some embodiments described FIG. 5C, no actual explicit command to copy the application to XIP memory is received. After optionally checking if the application resides in XIP memory (210), the application is executed (204).

In some embodiments, the amount of XIP memory within the smartcard is limited and it is desired to execute applications with a size that exceeds the amount of XIP memory available at a given time, or with a size that exceeds the total amount of XIP memory. In order to enable the internal smartcard processor to execute these large applications, certain embodiments of the present invention optionally include an enhanced paging mechanism. Thus, according to some embodiments of the present invention execution begins when only a first subportion of the executable code of the application resides in executable memory. After commencing execution, at least a second subportion of the copied executable code is paged (206) to executable memory.

In some embodiments, this enhanced paging mechanism is implemented as part of the smartcard operating system. For these embodiments, the copying mechanism first copies only a portion of the application code to the XIP memory. As soon as the smartcard processor must access a code area that is not loaded to the XIP memory, the application execution is interrupted and the desired code is copied as needed by the smartcard operating system to an XIP memory page, overwriting another piece of code that is not currently required or other data in the XIP memory. In order to provide an efficient paging mechanism, the paging can be supported by the smartcard hardware by implementing a logic that interrupts the smartcard processor as soon a new page is required, or alternatively by performing the copy operation using a Direct Memory Access (DMA) mechanism.

In some embodiments, the paging mechanism, if not yet supported by the smartcard operating system, is integrated with the application code; in this case, the application is designed to inherently support paging in the most efficient way possible.

Figure 6:
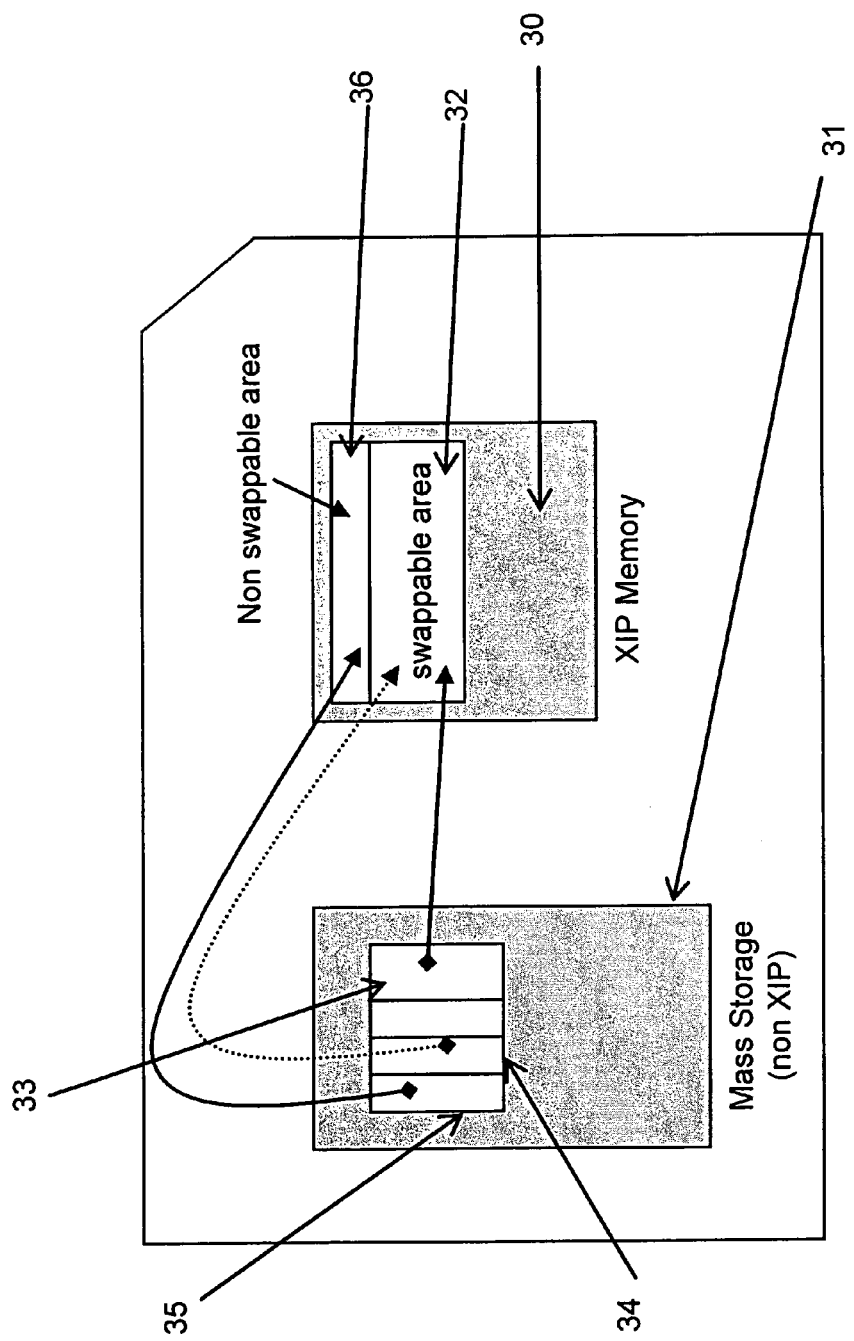
FIG. 6 illustrates one exemplary implementation for paging executable code using a paging mechanism.

FIG. 6 illustrates one exemplary implementation for paging executable code using a paging mechanism. An application resides in the non-volatile mass memory storage area (31) such as non-XIP memory. A request to run this application is received by the smartcard processor. In order to execute the application, the smartcard processor must copy the application from the non-XIP memory to the XIP memory area (30); however, the amount of free XIP memory (30) is not sufficient to contain the entire application. In order to overcome this limitation, the application is divided into segments (33, 34, 35). The main segment (35), which contains basic functionality and possibly paging-related functions, is copied to the XIP memory area (36). Additional segments of the application (33) are copied to a portion of XIP memory area (32) which is used as a swappable area (meaning the code in this area may later be swapped with another application code segment when necessary) on demand. The smartcard operating system can then start executing the application out of the XIP memory area.

As soon as the application reaches a point where there is a reference to data or code residing in a segment that has not been loaded to the XIP memory area, e.g. segment (34), the smartcard operating system loads the required segment (34) to the swappable area of the XIP memory area (32) over a previously loaded application segment, e.g. over segment (33).

Figure 7:
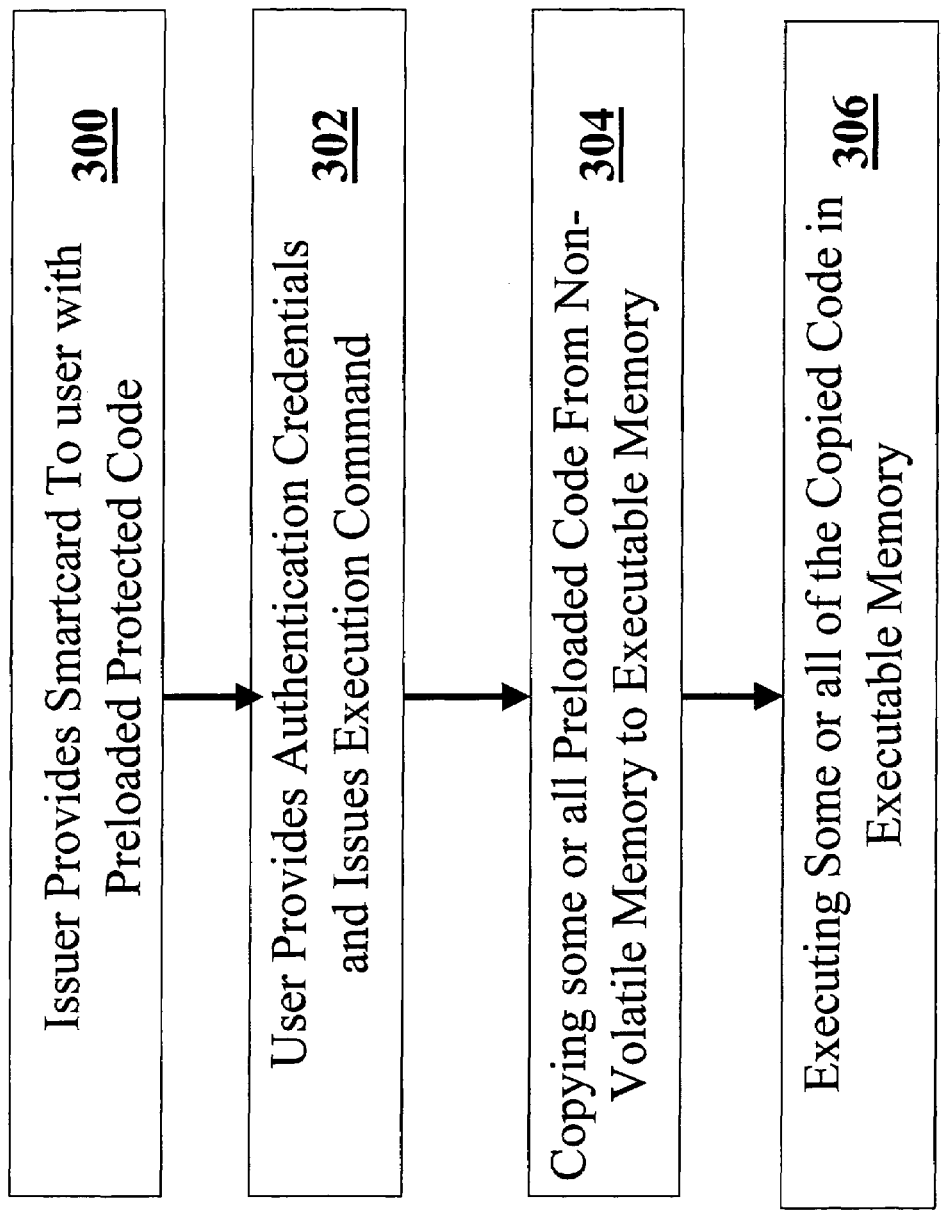
FIG. 7 provides a flowchart describing the delivering of pre-loaded protected code to smartcard users.

Some embodiments of the present invention provide methods of delivering pre-loaded protected executable code to smartcard users. A flowchart describing the delivering of pre-loaded protected code is presented in FIG. 7. As illustrated in FIG. 7, the issuer first provides (300) to one or more users smartcard devices including preloaded protected code residing in non-volatile memory such as non-XIP memory. After the user receives the smartcard device, he may elect to execute the protected application code by providing the appropriate authentication credentials and sending an execution command (302) to the smartcard device using the host device. Upon receiving the execution command, some or all of the preloaded protected code is copied (304) from non-volatile memory to executable memory, and the copied code is executed (306). Optionally, some program code is paged into executable memory after the execution process has begun.

It is noted that the present invention imposes no specific limitation on the copying (304) of the executable code. In some embodiments, the copying of the code from the non-volatile memory to the executable memory is only an internal copying through an internal data bus of the smartcard. Nevertheless, this is not an explicit requirement for every embodiment of the present invention. For example, according to embodiments that include the optional paging of code 206 to executable memory, and according to embodiments described in FIG. 7, the copying optionally includes external copying through the host device.

Thus, according to one example the service provider can pre-load a group of applications to a (U)SIM card before it is provided to the customer. The pre-loaded application code is protected from being read via the smartcard external interfaces; it is only possible to execute an application from this group via the smartcard processor, if the application is unlocked. When a customer wants to run a pre-loaded locked application, he calls the service provider and asks to subscribe to a new service. The service provider sends a "key" to the mobile terminal that unlocks the desired application; the key can enable the application unconditionally for limited amount of time, or for a prescribed number of executions. From that moment until the expiration of the key, the (U)SIM card CPU is enabled to execute the application.

Although certain aspects of the present invention have been described in terms of SIM and (U)SIM cards, it is noted that the present invention also relates to contactless smartcards.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A portable smartcard device for executing program code upon receipt of a command from a host system, the smartcard device comprising:
   a) at least one interface for presenting smartcard functionality to the host system and for receiving the command from the host system;
   b) a non-volatile non-executable memory for storing the program code before program execution;
   c) an executable memory for storing at least a portion of the program code during program execution; and
   d) an internal copying mechanism for copying said at least a portion of the program code from said non-executable memory to said executable memory.

2. The smartcard device of claim 1 wherein said non-volatile non-executable memory includes NAND flash memory, and said internal copying mechanism is operative to copy said at least a portion of the code from said NAND flash memory to said executable memory.

3. The smartcard device of claim 1 further comprising: e) an internal data bus, wherein said copying mechanism is operative to effect said copying only through said internal data bus.

4. The smartcard device of claim 1 further comprising: e) a program execution mechanism for executing said copied portion of the program code.

5. The smartcard device of claim 1 wherein said smartcard functionality includes SIM functionality.

6. The smartcard device of claim 1 wherein said smartcard functionality includes USIM functionality.

7. The smartcard device of claim 1 wherein said smartcard device has a plurality of said interfaces, a first said interface is a ISO 7816 compatible interface, a second said interface is other than a ISO 7816 compatible interface, and said command is received through said second interface.

8. The smartcard device of claim 7 wherein said second interface is a USB interface.

9. The smartcard device of claim 7 wherein said second interface is a MMC interface.

10. The smartcard device of claim 1 wherein said smartcard device has a plurality of said interfaces, a first said interface is a ISO 7816 compatible interface, a second said interface is other than a ISO 7816 compatible interface, and said command is received through said first interface.

11. The smartcard device of claim 1 wherein said executable memory includes at least one of EEPROM and NOR flash memory, and said internal copying mechanism is operative to copy said at least a portion of the code to at least one of said EEPROM and said NOR flash memory.

12. A portable smartcard device for executing program code upon receipt of a command from a host system, the smartcard device comprising: a) at least one interface for presenting smartcard functionality to the host system and for receiving the command from the host system; b) a non-volatile non-executable memory for storing the program code before program execution; c) an executable memory for storing at least a portion of the program code during program execution; d) a copying mechanism for effecting a copying of said at least a portion of the program code from said non-executable memory to said executable memory; and e) a program execution mechanism for commencing execution of said copied portion of the program code when only a first subportion of said copied portion resides in said executable memory.

13. The portable smartcard device of claim 12 further comprising: f) an internal data bus, wherein said copying mechanism is operative to effect said copying only through said internal data bus.

14. The portable smartcard device of claim 12 wherein said copying includes an external copying through the host system.

15. The smartcard device of claim 12 further comprising: f) a paging mechanism for paging at least a second subportion of said copied portion of the program code from said non-volatile non-executable memory to said executable memory during said executing.

16. The smartcard device of claim 12 wherein said non-volatile non-executable memory includes NAND flash memory, and said copying mechanism is operative to copy said at least a portion of the code from said NAND flash memory to said executable memory.

17. The smartcard device of claim 12 wherein said executable memory includes at least one of EEPROM and NOR flash memory, and said copying mechanism is operative to copy said at least a portion of the code to at least one of said EEPROM and said NOR flash memory.

18. A method of executing program code the method comprising: a) including within a smartcard device an internal copying mechanism; b) using said internal copying mechanism, copying at least a portion of the program code from non-volatile non-executable memory of said smartcard device to executable memory of said smartcard device; and c) upon receipt of an execution command through an interface of said smartcard device, executing said copied portion of the program code.

19. The method of claim 18 wherein said copying from said non-executable memory includes copying from NAND flash memory of said smartcard device.

20. The method of claim 18 wherein said copying is effected using only an internal data bus of said smartcard device.

21. The method of claim 18 wherein said smartcard device includes SIM functionality.

22. The method of claim 18 wherein said smartcard device includes USIM functionality.

23. The method of claim 18 wherein said command is received through an ISO 7816 compatible interface.

24. The method of claim 18 wherein said command is received through an interface other than an ISO 7816 compatible interface.

25. The method of claim 24 wherein said command is received through a USB interface.

26. The method of claim 24 wherein said command is received through a MMC interface.

27. The method of claim 18 wherein said executable memory includes at least one of EEPROM and NOR flash memory, and said copying includes copying to at least one of said EEPROM and said NOR flash memory.

28. A method of delivering pre-loaded protected executable code, the method comprising the steps of: a) providing to at least one smartcard user a respective smartcard device having the pre-loaded protected executable code stored in non-volatile non-executable memory and a copying mechanism for copying the pre-loaded protected executable code; b) after said providing, receiving from each said smartcard user valid user authentication credentials and an execution command through an interface of said respective smartcard device; c) using said copying mechanism of said respective smartcard device, copying at least a portion of the pre-loaded protected executable code from said non-volatile non-executable memory of said respective smartcard device to executable memory of said respective smartcard device; and d) using said respective smartcard device, executing said portion of the program code.

29. The method of claim 28 wherein for at least one said respective smartcard device said copying includes only copying through an internal data bus.

30. The method of claim 28 wherein for at least one said respective smartcard device at least one of said user authentication credentials and said execution command is received via a host device, and said copying includes external copying through said host device.

31. The method of claim 28 wherein said non-volatile non-executable memory includes NAND flash memory, and said copying includes copying from said NAND flash memory.

32. The method of claim 28 wherein said executable memory includes at least one of EEPROM and NOR flash memory, and said copying includes copying to at least one of said EEPROM and said NOR flash memory.

33. A method of executing program code comprising: a) including within a smartcard device a copying mechanism; b) using said copying mechanism copying at least a portion of the program code from non-volatile non-executable memory of said smartcard device to executable memory of said smartcard device; and c) upon receipt of an execution command through an interface of said smartcard device, commencing execution of said portion of the program code when only a first subportion of said portion resides in said executable memory.

34. The method of claim 33 wherein said copying includes only copying through an internal data bus of said smartcard device.

35. The method of claim 33 wherein said execution command is received from a host device, and said copying includes external copying through said host device.

36. The method of claim 33 wherein said executing includes paging at least a second subportion of said portion of the program code from said non-volatile non-executable memory to said executable memory during said executing.

37. The method of claim 33 wherein said non-volatile non-executable memory includes NAND flash memory, and said copying includes copying from said NAND flash memory.

38. The method of claim 33 wherein said executable memory includes at least one of EEPROM and NOR flash memory, and said copying includes copying to at least one of said EEPROM and said NOR flash memory.

39. A computer readable storage medium having computer readable code embodied in said computer readable storage medium, said computer readable code for a) receiving a command to execute program code stored in a non-volatile non-executable memory of a smartcard device; b) internally copying at least a portion of said executable program code from said non-volatile non-executable memory of said smartcard device to executable memory of said smartcard device; and c) executing by said smartcard device said portion of said program code.

40. A computer readable storage medium having computer readable code embodied in said computer readable storage medium, said computer readable code for a) receiving a command to execute program code stored in a non-volatile non-executable memory of a smartcard device; b) copying at least a portion of said executable program code from said non-volatile non-executable memory of said smartcard device to executable memory of said smartcard device; and c) commencing executing by said smartcard device of said portion of said program code when only a subportion of said portion resides in said executable memory.

* * * * *